Dec. 25, 1956     W. A. PAPWORTH     2,775,272
PORTABLE POWER DRIVEN RECIPROCABLE CUTTING TOOL
Filed Nov. 27, 1953     2 Sheets-Sheet 1

Inventor:
Walter A. Papworth
By: Schroeder, Merriam,
Hofgren & Brady
Attorneys

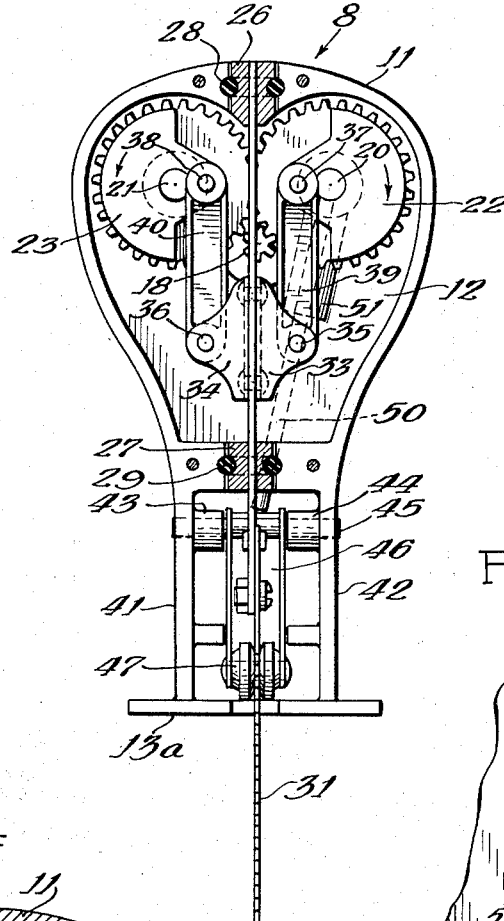
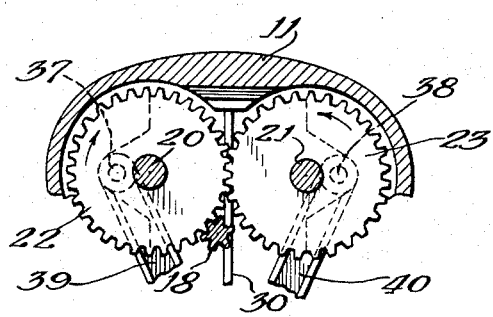
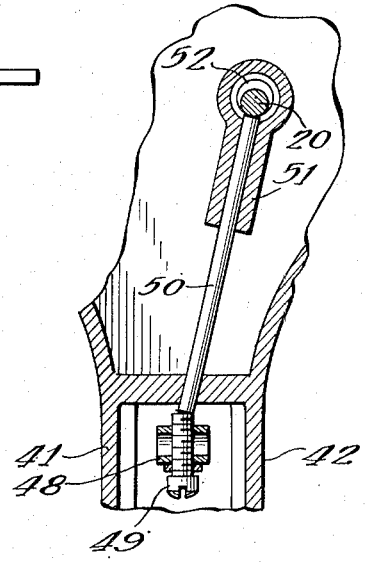

United States Patent Office 2,775,272
Patented Dec. 25, 1956

2,775,272

PORTABLE POWER DRIVEN RECIPROCABLE CUTTING TOOL

Walter A. Papworth, Syracuse, N. Y.

Application November 27, 1953, Serial No. 394,537

14 Claims. (Cl. 143—68)

This invention relates to a portable power driven reciprocable cutting tool, and in particular it relates to portable bayonet saw in which the blade may be operated either in straight line reciprocation or may oscillate forward into the work on its cutting stroke and away from the work face on its return stroke.

The principal object of the invention is to provide a low cost reciprocable cutting tool.

A further object is to provide a simple mechanism for moving a saw blade forwardly into the work face on its cutting stroke and withdrawing it from the work face on its return stroke so as to cut down the frictional drag on the return stroke and reduce wear on the saw blade.

A further object of the invention is to provide such a device in which reciprocation is accomplished by means of connecting rods driven by a pair of oppositely rotating gears, and in which the saw blade cuts as it moves toward said gears so that in the working phase of the movement the connecting rods and tool plunger are in tension, thus permitting the use of very lightweight connecting rods and plunger.

A further object of the invention is to provide a simple removable linkage for producing the forward movement of the saw blade into the work on its cutting stroke so that the tool may be used either in straight reciprocation or with the aforesaid movement into the work face on the cutting stroke.

The invention is illustrated in a preferred embodiment in the accompanying drawings in which:

Fig. 3 is a section taken as indicated along the line 3—3 of Fig. 1;

Fig. 4 is a fragmentary section taken as indicated along the line 4—4 of Fig. 1;

Fig. 5 is a fragmentary section taken as indicated along the line 5—5 of Fig. 1; and Fig. 6 is a diagram of the path followed by the cutting tool when it is being moved forward into the work on its cutting stroke and withdrawn from the work face on its return stroke, shown 1½ times actual size.

Figure 1:
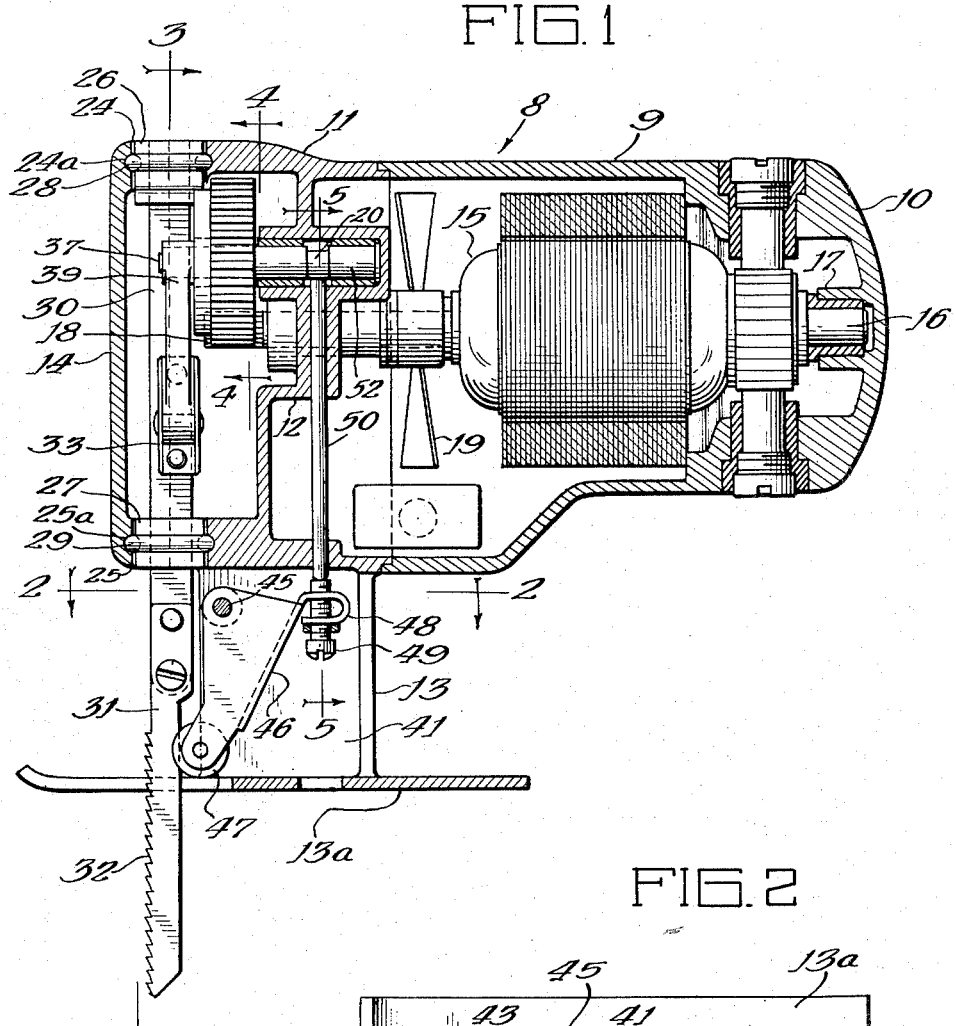
Fig. 1 is a central vertical sectional view of the device.
Figure 2:
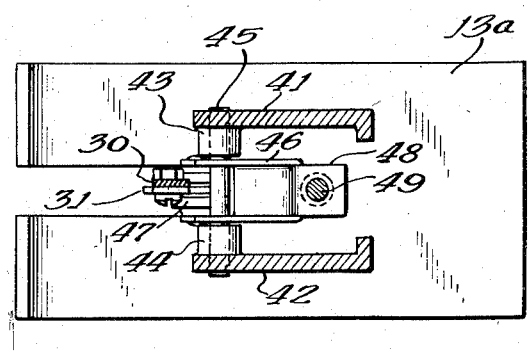
Fig. 2 is a section taken as indicated along the line 2—2 of Fig. 1.

Referring to the drawings in greater detail and referring first to Fig. 1, the cutting tool has a casing, indicated generally at 8, which includes a motor case portion 9 provided with a removable back plate 10, a gear case portion 11 having a gear supporting wall 12 and an integral pedestal member 13 at its lower end, and a front cover 14. An electric motor 15 in the motor casing 9 has a motor shaft 16 which is journaled at one end in a boss 17 in the rear cover member 10 and which is journaled at its forward end in an opening in the gear supporting wall 12, the front of the motor shaft 16 being provided with a pinion 18. An air circulating fan 19 is mounted on the motor shaft 16 immediately forward of the motor in the customary manner; and a suitable electric power cord and switch (not shown) are also provided.

As best seen in Fig. 3, a pair of parallel shafts 20 and 21 are journaled in recesses in the gear supporting wall 12 above, and parallel to the motor shaft 16, and said shafts 20 and 21 are provided with intermeshing gears 22 and 23, respectively, the gear 22 being engaged with the pinion 18 on the motor shaft.

Referring now to Fig. 1, at the top and bottom of the casing 8, forward of the gears 22 and 23, are aligned apertures 24 and 25 which are formed half in the front face of the gear case 11 and half in the rear face of the front cover 14, said apertures having circumferential grooves 24a and 25a, respectively. Bushings 26 and 27 are mounted, respectively, in the apertures 24 and 25, said bushings being somewhat smaller than the apertures and being provided with circumferential grooves to receive bands 28 and 29, respectively, of rubber or other resilient material, said bands fitting into the grooves 24a and 25a respectively, so that the bushings may move laterally in the apertures by compression of the bands. Each of the bearings has a rectangular central slot which serves as a guide for a thin, lightweight sheet metal tool plunger 30 which extends vertically in the casing and is mounted for reciprocating movement in the bushings and has its lower end in a position below the casing to receive a saw blade 31 or other cutting tool which has its teeth 32 arranged to cut on the upstroke—that is, as the blade is being moved toward the gears 22 and 23.

As seen in Fig. 3, mounted on the tool plunger 30 are clevis brackets 33 and 34 which are provided, respectively, with wrist pins 35 and 36. The gears 22 and 23 are provided with crank pins 37 and 38, respectively, which are connected, respectively, by lightweight connecting rods 39 and 40 with the wrist pins 35 and 36 so that the motor 15 reciprocates the tool plunger through the pinion 18, gears 22 and 23, and connecting rods 39 and 40. The tool plunger and connecting rods may be of strip steel, or very light material such as molded nylon or magnesium, since cutting takes place with those parts in tension. The gears 22 and 23 have counterbalance portions 22a and 23a, respectively.

As best seen in Fig. 3, the pedestal member 13 includes a slotted foot 13a and a pair of upstanding sidewalls 41 and 42 which are provided with bosses 43 and 44, respectively, to receive a fulcrum pin 45 on which is mounted a bell crank 46 which has at its lower end a rotatable grooved roller 47 which bears against the rear of the saw blade 31. As best seen in Fig. 1, on the arm of the bell crank opposite the roller 47 is a mounting eye 48 for an adjusting screw 49, and supported on the adjusting screw and extending diagonally upward therefrom (see Fig. 5) is a push rod 50 which passes through a guide bore 51 in the tool supporting wall 12 and has its upper end bearing against an eccentric 52 of small throw which is formed in the shaft 20. The eccentric 52 is so positioned on the shaft 20 with respect to the crank pin 37 that it starts to move the push rod 50 down as the tool plunger 30 starts its upstroke. The downward movement of the push rod 50 acts through the bell crank 46 and the grooved roller 47 to thrust the saw blade 31 forwardly into the work as the blade moves up on its cutting stroke, the forward movement being permitted by reason of the resilient mounting for the bearings 26 and 27 afforded by the rubber rings 28 and 29. The pressure of the eccentric 52 on the push rod 50 has ceased by the time the saw blade goes into its return stroke, and the thrust of the resilient rings 28 and 29 has returned the bushings 26 and 27 and the tool plunger 30 to their normal positions so that the saw is withdrawn from engagement with the work on its return stroke.

As is clear from Fig. 1, the adjustment screw 49 may be removed to entirely withdraw the push rod 50 from the casing if it is desired to operate the tool in a straight reciprocating stroke without having the blade rocked into the work on the cutting stroke; and in such use the screw 49 will be again screwed into the mounting eye 48 and brought to bear against the bottom of the casing 8 so as to hold the roller 47 in engagement with the rear of the saw blade.

The path following by the saw blade 31 is traced in Fig. 6 where the tracing is 1½ times actual size. The very short forward movement of the blade on its cutting stroke permits the saw to cut around a radius which is very slightly greater than the width of the blade, as contrasted with ordinary orbital motion saws which have a substantial fore and aft movement of the blade so that they may cut only on a radius determined by the width of the blade plus the depth of the large fore and aft movement.

For assembly purposes, the tool plunger 30, clevis brackets 33 and 34, connecting rods 39 and 40, and bushings 26 and 27 with their rubber rings 28 and 29 comprise a prefabricated sub-assembly which may be installed or removed as a unit upon removal of the front cover 14.

The foregoing detailed description is given for clearness of understanding only and no unnecessary limitations are to be understood therefrom, as some modifications will be obvious to those skilled in the art.

I claim:

1. A power driven manually portable reciprocable cutting tool comprising: a casing having a lower wall provided with an opening; vertically positioned cutter means mounted for endwise movement in said casing, said cutter means including a tool plunger extending through said opening in the lower wall of the casing and a toothed cutting tool secured to the plunger outside the casing; yielding bearing means supporting said tool plunger in the casing, whereby the cutting tool may move fore and aft through a small distance; drive means in the casing for imparting endwise movement to said tool plunger; and pusher means one end portion of which engages a portion of the drive means and the other end portion of which bears on the back of the cutter means to press the cutting tool forwardly on its cutting stroke and release it on its return stroke.

2. The device of claim 1 in which the drive means includes a rotatable member which is provided with an eccentric of small throw, and the pusher means engages the eccentric.

3. The device of claim 1 in which the bearing means comprises a pair of spaced, rigid bearing members supported in resilient mountings.

4. A power driven manually portable reciprocable cutting tool comprising: a casing having a lower wall provided with an opening; a motor in said casing having a rotatable motor shaft with a pinion thereon; vertically positioned cutter means mounted for endwise movement in said casing, said cutter means including a tool plunger extending through said opening in the lower wall of the casing and a toothed cutting tool secured to the plunger outside the casing; a pair of intermeshing drive gears one of which engages said pinion; a connecting rod extending between each gear and the tool plunger for imparting endwise movement to said cutter means; yielding bearing means supporting said tool plunger in the casing, whereby the tool plunger may move fore and aft through a small distance; and pusher means one end portion of which engages a portion of the drive means and the other end portion of which bears on the back of the cutter means to press the cutting tool forwardly on its cutting stroke and release it on its return stroke.

5. A power driven reciprocable cutting tool comprising: a casing; a motor in said casing having a rotatable motor shaft with a pinion thereon; vertically positioned cutter means mounted for endwise movement in said casing, said cutter means including a tool plunger and a toothed cutting tool secured thereto; a pair of spaced shafts parallel to said motor shaft, one of said shafts being provided with an eccentric of small throw; a pair of intermeshing gears on said shafts one of which engages said pinion; a connecting rod extending between each gear and the tool plunger for imparting endwise movement to said cutter means; yielding bearing means supporting said tool plunger in the casing, whereby the tool plunger may move fore and aft through a small distance; a movable pressure support bearing on the rear of the cutting tool; and actuating means bearing upon said eccentric for reciprocating the pressure support, said eccentric being timed to press the cutting tool forward on its cutting stroke and release it on its return stroke.

6. A power driven manually portable reciprocable cutting tool comprising: a casing having a lower wall provided with an opening; a motor in said casing having a rotatable motor shaft provided with a pinion; vertically positioned cutter means mounted for reciprocating movement on said casing, said cutter means including a tool plunger of very light weight extending through said opening in the lower wall of the casing and a toothed cutting tool secured to the plunger outside the casing which is adapted to cut as it is moved in the direction of the motor shaft; a pair of spaced shafts parallel to said motor shaft, one of said shafts being provided with an eccentric of small throw; a pair of intermeshing gears on said shafts one of which engages said pinion; a connecting rod of very light weight extending between each gear and said tool plunger for reciprocating the tool plunger; yielding bearing means supporting said tool plunger in the casing, whereby the tool plunger may move fore and aft through a small distance; and pusher means reciprocated by said eccentric, said pusher means having an end portion which bears on the back of the cutting tool below its connection to the tool plunger to press the cutting tool forwardly on its cutting stroke and release it on its return stroke.

7. A power driven reciprocable cutting tool comprising: a casing having a pair of aligned apertures; a motor in said casing having a rotatable motor shaft which is perpendicular to the median plane of said apertures; a pinion on said motor shaft; a pair of spaced shafts parallel to and above said drive shaft, one of said shafts being provided with an eccentric of small throw; a pair of intermeshing gears on said shafts one of which engages said pinion; a crank pin on each of said gears; a lightweight sheet metal tool plunger mounted in said frame for endwise movement generally perpendicular to said shafts, said tool plunger being provided with sheet metal clevis brackets carrying wrist pins; a light-weight sheet metal connecting rod extending from each of said crank pins to the corresponding one of said wrist pins to impart endwise movement to said tool plunger; a pair of bearing members for the tool plunger mounted in the apertures in the casing, said bearing members being smaller than said apertures; a rubber mounting ring surrounding each of said bearing members and engaging the wall of the aperture to permit displacement of the tool plunger in a direction parallel to the axes of the crank pins; a saw blade mounted at the lower end of said tool plunger which is adapted to cut on the upstroke of the plunger; a bell crank which has one arm provided with a grooved guide roller which bears on the back of said saw blade; and a push rod extending between the other arm of said bell crank and said eccentric for reciprocating the pressure support and tool, said eccentric being timed to move the saw blade forward into the work on its cutting stroke and permit it to be returned to its normal position by means of the rubber rings on the guide members upon the return stroke.

8. A power driven reciprocable cutting tool comprising: a casing; vertically positioned cutter means mounted for endwise movement in said casing, said cutter means including a tool plunger and a toothed cutting tool secured thereto; yielding bearing means supporting said tool plunger in the casing, whereby the cutting tool may move fore and aft through a small distance; drive means in the casing for imparting endwise movement to said tool plunger; a bell crank pivoted at the bottom of the casing which has a guide roller in one arm bearing on the rear of the cutting tool; and a push rod extending from the bell crank into engagement with a portion of the driving means, whereby the cutting tool is pressed forwardly on its cutting stroke and released on its return stroke.

9. A power driven reciprocable cutting tool comprising: a casting; vertically positioned cutter means mounted for endwise movement in said casing, said cutter means including a tool plunger and a toothed cutting tool secured thereto; yielding bearing means supporting said tool plunger in the casing, whereby the cutting tool may move fore and aft through a small distance; drive means in the casing for imparting endwise movement to said tool plunger, said drive means being provided with an eccentric of small throw, a bell crank pivoted at the bottom of the casing which has a roller in one arm bearing on the rear of the cutting tool; and a push rod engaging the other arm of the bell crank and bearing on said eccentric, whereby the cutting tool may be pressed forwardly on its cutting stroke and released on its return stroke.

10. A power driven reciprocable cutting tool comprising: a casing; vertically positioned cutter means mounted for endwise movement in said casing, said cutter means including a tool plunger and a toothed cutting tool secured thereto; yielding bearing means supporting said tool plunger in the casing, whereby the cutting tool may move fore and aft through a small distance; drive means in the casing for imparting endwise movement to said tool plunger; a bell crank pivoted close to the bottom of the casing which has a guide roller in one arm bearing on the rear of the cutting tool and an uprightly extending set screw in the other arm; a push rod seated on said set screw and extending through an aperture in the casing to engage a portion of the drive means, said push rod being removable whereby the set screw may be adjusted to bear on the casing and permit the guide roller to guide the cutting tool in straight endwise movement, the engagement of said push rod with the drive means serving to press the cutting tool forwardly on its cutting stroke and release it on its return stroke.

11. A power driven manually portable reciprocable cutting tool comprising: a casing having a lower wall provided with an opening; vertically positioned cutter means mounted for endwise and limited fore and aft movement in said casing, said cutter means including a tool plunger extending through said opening in the wall of the casing and a toothed cutting tool secured to said tool plunger outside the casing; resilient means bearing on said tool plunger in the plane of its fore and aft movement to urge the tool plunger toward a predetermined position; drive means in the casing for imparting endwise movement to said tool plunger; and pusher means one end portion of which engages a portion of the drive means and the other end portion of which bears on the back of the cutter means to press the cutting tool forwardly against the urging of said resilient means on its cutting stroke, and release it on its return stroke.

12. A power driven manually portable reciprocable cutting tool comprising: a casing having a lower wall provided with an opening, vertically positioned cutter means mounted for endwise and limited fore and aft movement in said casing, said cutter means including a tool plunger extending through said opening in the lower wall of the casing and a toothed cutting tool secured to said tool plunger outside the casing; resilient means bearing on said tool plunger in the plane of its fore and aft movement to urge the tool plunger toward a predetermined position; drive means in the casing for imparting endwise movement to said tool plunger; an eccentric driven by said drive means; a movable pressure support bearing on the rear of the cutting tool; and pusher means one end portion of which engages said eccentric and the other end portion of which engages the pressure support to press the cutting tool forwardly against the urging of said resilient means on its cutting stroke and release it on its return stroke.

13. In a manually portable, power driven, reciprocable cutting tool: a casing having a lower wall provided with an opening; vertically positioned cutter means mounted for endwise movement in said casing, said cutter means including a tool plunger extending through said opening in the lower wall of the casing and a toothed cutting tool secured to the plunger outside the casing; drive means in the casing; reciprocating means including a first eccentric driven by said drive means and operatively connected with the tool plunger for imparting endwise motion to the latter; oscillating means including a second eccentric driven by said drive means and a movable pressure support bearing on the rear of the cutter means and operatively connected to said second eccentric to thrust the cutting tool forwardly during its cutting stroke only; and resilient means bearing on the tool plunger for returning the cutter means from the forwardly thrust position on its return stroke.

14. In a manually portable, power driven, reciprocable cutting tool: a casing having a wall provided with an opening; cutter means mounted in said casing for movement generally endwise of itself, said cutter means including a tool plunger extending through said opening in the lower wall of the casing and a toothed cutting tool secured to the plunger outside the casing; drive means in the casing; eccentric means operated by said drive means; a driving connection from said eccentric means to the tool plunger to impart endwise movement to said tool plunger; and pusher means wholly separate from said driving connection, one end portion of said pusher means engaging the eccentric means and the other end portion thereof bearing on the back of the cutter means to move the cutting tool edgewise on its cutting stroke only; the relationship between the driving connection and the pusher means being such that the forward movement is only a small fraction of the endwise movement.

References Cited in the file of this patent

UNITED STATES PATENTS

| | | |
|---|---|---|
| 339,000 | McEvilla | Mar. 30, 1886 |
| 486,169 | Spofford | Nov. 15, 1892 |
| 1,150,004 | Hutton | Aug. 10, 1915 |
| 1,269,883 | Wardman | June 18, 1918 |
| 1,496,490 | Powell | June 3, 1924 |
| 1,925,348 | Timbs | Sept. 5, 1933 |
| 2,134,072 | Christensen | Oct. 25, 1938 |
| 2,501,631 | Oschwald | Mar. 21, 1950 |
| 2,595,464 | Kaufmann | May 6, 1952 |